United States Patent
Zeng et al.

(10) Patent No.: US 12,103,399 B1
(45) Date of Patent: Oct. 1, 2024

(54) HYBRID ELECTRIC DRIVING DEVICE

(71) Applicant: SHENZHEN XINGKANG POWER ASSEMBLY CO., LTD., Shenzhen (CN)

(72) Inventors: Qingwen Zeng, Shenzhen (CN); Jiancheng Liang, Shenzhen (CN)

(73) Assignee: SHENZHEN XINGKANG POWER ASSEMBLY CO., LTD., Shenzhen (CN)

( * ) Notice: Subject to any disclaimer, the term of this patent is extended or adjusted under 35 U.S.C. 154(b) by 0 days.

(21) Appl. No.: 18/485,269

(22) Filed: Oct. 11, 2023

(30) Foreign Application Priority Data

May 24, 2023 (CN) .......................... 202310591831.X

(51) Int. Cl.
  *B60K 6/442* (2007.10)
  *B60K 6/365* (2007.10)
  *F16H 3/00* (2006.01)
  *B60K 6/445* (2007.10)

(52) U.S. Cl.
  CPC .............. *B60K 6/365* (2013.01); *B60K 6/442* (2013.01); *F16H 3/006* (2013.01); *B60K 6/445* (2013.01)

(58) Field of Classification Search
  CPC ........ B60K 6/445; B60K 6/365; B60K 6/442; B60K 6/50
  See application file for complete search history.

(56) References Cited

U.S. PATENT DOCUMENTS

| | | | | |
|---|---|---|---|---|
| 7,942,776 B2* | 5/2011 | Conlon | ................. | B60K 6/547 475/5 |
| 2011/0059824 A1* | 3/2011 | Buannec | ................. | F16H 3/728 475/303 |
| 2021/0031746 A1* | 2/2021 | Tabata | ................. | B60W 20/40 |

FOREIGN PATENT DOCUMENTS

| | | | | |
|---|---|---|---|---|
| CN | 106976390 A | * | 7/2017 | |
| CN | 106915248 B | * | 5/2019 | ............... B60K 6/24 |
| DE | 102016101059 A1 | * | 7/2017 | |
| DE | 102016204488 A1 | * | 9/2017 | ............... B60K 6/36 |

* cited by examiner

*Primary Examiner* — Sherry L Estremsky

(57) ABSTRACT

A hybrid electric driving device includes an engine, a first motor, a second motor, a power splitting mechanism, and a bypass mechanism. The power splitting mechanism includes at least one planetary gear set, an input end, a first output end, and a second output end. The input end of the power splitting mechanism is connected with the engine. The first output end of the power splitting mechanism is connected with the first motor. The second output end of the power splitting mechanism is connected with a wheel of a vehicle. The second motor is connected with the wheel. The bypass mechanism is configured to connect with or separated from the first output end and the second output end of the power splitting mechanism. The bypass mechanism includes an engagement separation component.

10 Claims, 3 Drawing Sheets

HYBRID ELECTRIC DRIVING DEVICE

TECHNICAL FIELD

The present disclosure relates to a field of vehicle drive technology, and in particular to a hybrid electric driving device.

BACKGROUND

A conventional power splitting hybrid electric driving device based on planetary gear sets generally uses planetary gear sets to split power output by an engine into two power flows. A first power flow drives a first motor to generate electricity, and a second power flow converges with power output by a second motor to drive a vehicle.

However, the conventional power splitting hybrid electric driving device has following defects. Specifically, when in a pure electric driving mode, in order to enable the two motors to drive the vehicle together, a one-way clutch is installed on an output end of the engine. When the first motor is driven by the engine, the first motor only rotates in one direction. If the first motor rotates reversely, the first motor drives the engine to rotate. Therefore, when the vehicle is in the pure electric driving mode, the first motor is unable to provide power for reversing, and the second motor drives the vehicle to reverse. Based on a comprehensive consideration, a size of the second motor is not large, resulting in a small driving torque when the vehicle reverses, so the vehicle cannot climb a steep slope when reversing, and a reversing performance of the vehicle is limited, which is difficult to meet performance requirements of a commercial vehicle. When the vehicle reverses in a hybrid mode, a split driving force output from the engine only drives the wheel to move forward, which is not only not helpful for reversing, but also reduces a driving torque for reversing. Therefore, the conventional power splitting hybrid electric driving device is difficult to meet high reversing performance requirements, and is difficult to meet the performance requirements of the commercial vehicle. Therefore, it is necessary to provide a power splitting hybrid electric driving device with high comprehensive performance to solve at least one of the above defects.

SUMMARY

A purpose of the present disclosure is to overcome defects in the prior art and provide a hybrid electric driving device having a high comprehensive performance.

The hybrid electric driving device comprises an engine, a first motor, a second motor, a power splitting mechanism, and a bypass mechanism.

The power splitting mechanism comprises at least one planetary gear set, an input end, a first output end, and a second output end. The input end of the power splitting mechanism is connected with the engine. The first output end of the power splitting mechanism is connected with the first motor. The second output end of the power splitting mechanism is connected with a wheel of a vehicle. The second motor is connected with the wheel.

The bypass mechanism is configured to engage the first output end of the power splitting mechanism with the second output end of the power splitting mechanism. The bypass mechanism comprises an engagement separation component. When the engine works, the bypass mechanism is disengaged from the power splitting mechanism, and power output by the engine is transmitted to the power splitting mechanism to drive the first output end and the second output end of the power splitting mechanism respectively. When the engine is not in work, the bypass mechanism is engaged with the power splitting mechanism, and power of the first motor is directly transmitted from the first output end of the power splitting mechanism to the second output end of the power splitting mechanism without transmitting through an interior of the power splitting mechanism.

Optionally, a speed ratio of the bypass mechanism from the first output end to the second output end of the power splitting mechanism is-K. K is a ratio of a torque of the second output end of the power splitting mechanism to a torque of the first output end of the power splitting mechanism when the power output by the engine is split by the power splitting mechanism.

Optionally, the power splitting mechanism comprises a first planetary gear set and a second planetary gear set. The first planetary gear set comprises a first sun gear, a first planet carrier, and a first gear ring. The second planetary gear set comprises a second sun gear, a second planet carrier, and a second gear ring. The engine is fixedly connected with the first planet carrier. The first motor is fixedly connected with the first sun gear. The first planet carrier is fixedly connected with the second sun gear. The first gear ring is fixedly connected with the second gear ring. The second planet carrier is connected with the wheel. $K=k_1+k_1/k_2$. $k_1$ is a structural feature parameter of the first planetary gear set. $k_2$ is a structural feature parameter of the second planetary gear set.

Optionally, the bypass mechanism comprises a first gear mounted on the first output end of the power splitting mechanism, a second gear mounted on the second output end of the power splitting mechanism, and intermediate gears. The intermediate gears are engaged with the first gear and the second gear for transmission. The number of the intermediate gears is an odd number.

Optionally, the power splitting mechanism comprises a first planetary gear set. The first planetary gear set comprises a first sun gear, a first planet carrier, and a first gear ring. The engine is fixedly connected with the first planet carrier. The first motor is fixedly connected with the first sun gear. The first gear ring is fixedly connected with the wheel. $K=k_1$. $k_1$ is a structural feature parameter of the first planetary gear set.

Optionally, the bypass mechanism comprises a third planetary gear set. The third planetary gear set comprising a third sun gear, a third planet carrier, and a third gear ring. The third gear ring is fixedly connected with the first gear ring. The third sun gear is fixedly connected with the first sun gear. The third planet carrier is connected with a box body through the engagement separation component. $k_3$ is a structural feature parameter of the third planetary gear set. $k_3=k_1$.

Optionally, the third planetary gear set is same as the first planetary gear set.

Optionally, in a pure electric driving mode, the engagement separation component engages the first output end of the power splitting mechanism with the second output end of the power splitting mechanism, the engine is not in work, and the first motor and the second motor jointly drive the vehicle to move forward or backward.

Optionally, when the pure electric driving mode is switched to a hybrid driving mode, the engagement separation component disengages the first output end of the power splitting mechanism with the second output end of the power splitting mechanism, the first motor drives the engine to start, and the second motor drives the wheel to move.

Optionally, when in the hybrid driving mode, the engagement separation component disengages the first output end of the power splitting mechanism with the second output end of the power splitting mechanism, and the power output by the engine is transmitted to the power splitting mechanism to drive the first motor and the wheel; the second motor also drives the wheel.

In the hybrid electric driving device of the present disclosure, the bypass mechanism ensures that the two motors jointly drive the vehicle forward or reverse in the pure electric driving mode, thereby improving a performance of the hybrid electric driving device.

Figure 1:
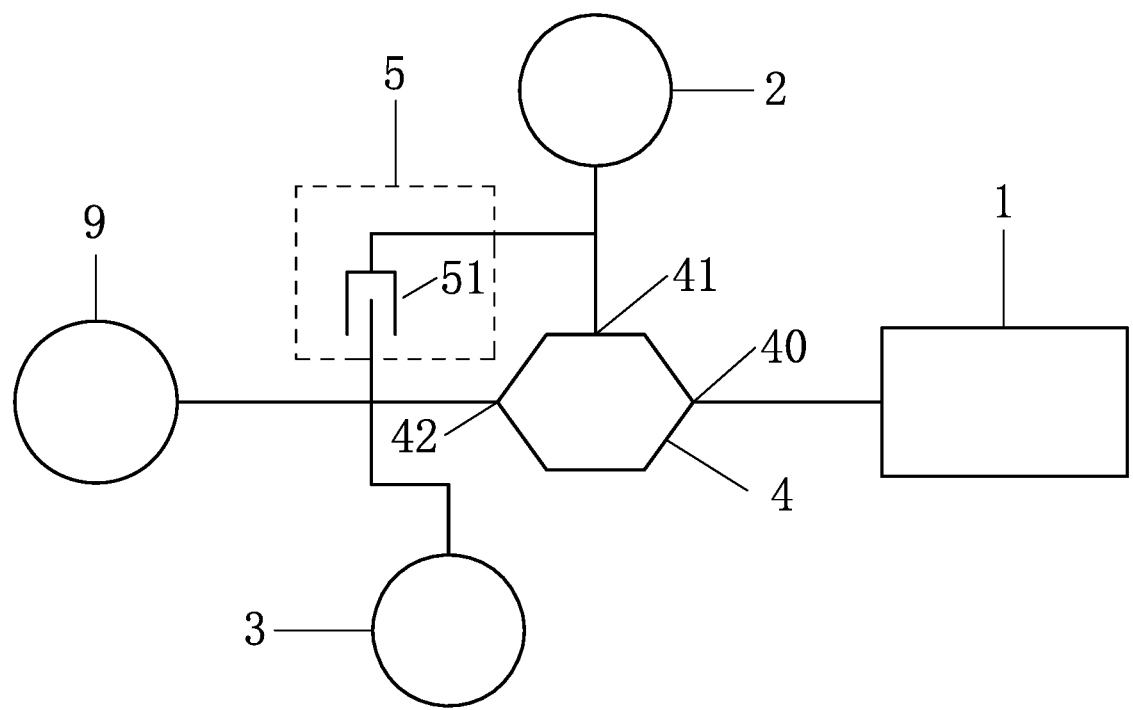
FIG. 1 is a structural schematic diagram of a hybrid electric driving device according to a first embodiment of the present disclosure.

1-engine; 2-first motor; 3-second motor; 4-power splitting mechanism; 40-input end; 41-first output end; 42-second output end; 43-first planetary hear set; 431first sun gear; 432-first planetary carrier; 433-first gear ring; 44-second planetary hear set; 441 second sun gear; 442-second planetary carrier; 443-second gear ring; 5-bypass mechanism; 51-engagement separation component; 52-first gear; 53-second gear; 54-intermediate gears; 55-third planetary hear set; 551third sun gear; 552-third planetary carrier; 553-third gear ring; 8 box body; 9 wheel.

DETAILED DESCRIPTION

Embodiments of the present disclosure are described in detail below. Examples of the embodiments are shown in accompanying drawings, in which same or similar reference numerals indicate the same or similar components or components with the same or similar functions. The embodiments described below with reference to the drawings are exemplary, and are intended to explain the present disclosure, but should not be regarded as a limitation to the present disclosure.

It should be understood that in the description of the present disclosure terms such as "central", "lateral", "lengthways", "length", "width", "thickness", "upper", "lower", "left", "right", "vertical", "horizontal", "top", "bottom", "inner", "outer", "clockwise", "counterclockwise", etc., indicate direction or position relationships shown based on the drawings, and are only intended to facilitate the description of the present disclosure and the simplification of the description rather than to indicate or imply that the indicated device or component must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified.

It should be noted in the description of the present disclosure that, unless otherwise regulated and defined, terms such as "installation," "bonded," and "connection" shall be understood in broad sense, and for example, may refer to fixed connection or detachable connection or integral connection; may refer to mechanical connection or electrical connection; and may refer to direct connection or indirect connection through an intermediate medium or inner communication of two components. For those of ordinary skill in the art, the meanings of the above terms in the present disclosure may be understood according to concrete conditions.

In the present disclosure, unless expressly stipulated and defined otherwise, the first feature is arranged "above" or "below" the second feature may means that the first feature directly contact the second feature, or the first feature does not directly contact the second feature but connected with the second feature through other features between them. Furthermore, the first feature is arranged "on", "above" or "over" the second feature means that the first feature may arrange directly above and obliquely above the second feature, or it may merely indicate that a level of the first feature is greater than a level of the second feature. The first feature is arranged "below", "under", and "beneath" the second feature means that the first feature is arranged directly below and obliquely below the second feature, or it simply means that the level of the first feature is less than the level of second feature.

FIG. 1 is a structural schematic diagram of a hybrid electric driving device according to a first embodiment of the present disclosure. As shown in FIG. 1, the hybrid electric driving device comprises an engine 1, a first motor 2, a second motor 3, a power splitting mechanism 4, and a bypass mechanism 5.

The power splitting mechanism 4 comprises at least one planetary gear set, an input end 41, a first output end 42, and a second output end 43. The input end 41 of the power splitting mechanism 4 is connected with the engine 1. The first output end 41 of the power splitting mechanism 4 is connected with the first motor 2. The second output end 42 of the power splitting mechanism 4 is connected with a wheel 9 of a vehicle. The second motor 3 is connected with the wheel 9.

The bypass mechanism 5 is configured to engage the first output end 41 with the second output end 72 of the power splitting mechanism 4. The bypass mechanism 5 comprises an engagement separation component 51. When the engine 1 works, the bypass mechanism 5 is disengaged from the power splitting mechanism 4, and power output by the engine 1 is transmitted to the power splitting mechanism 4 to drive the first output end 41 and the second output end 42 of the power splitting mechanism 4 respectively. When the engine 1 is not in work, the bypass mechanism 5 is engaged with the power splitting mechanism 4, and power of the first motor 2 is directly transmitted from the first output end 41 of the power splitting mechanism 4 to the second output end 42 of the power splitting mechanism 4 without transmitting through in interior of the power splitting mechanism 4.

A speed ratio of the bypass mechanism 5 from the first output end 41 to the second output end 42 of the power splitting mechanism 4 is-K. K is a ratio of a torque of the second output end 42 of the power splitting mechanism 4 to a torque of the first output end 41 of the power splitting mechanism 4 when the power output by the engine 1 is split by the power splitting mechanism 4. In a kinematics equation of the power splitting mechanism 4 including the at least one planetary gear set, a natural rotating speed of the input end 40 of the power splitting mechanism 4 is zero, and a rotating speed of the engine 1 connected with the input end 40 of the power splitting mechanism is zero. Therefore, the rotating speed of the engine 1 is guaranteed to be zero without adding a unidirectional clutch, and a rotating direction of the first motor 2 is not limited, thus significantly improving a performance of the vehicle under a pure electric driving mode.

Figure 2:
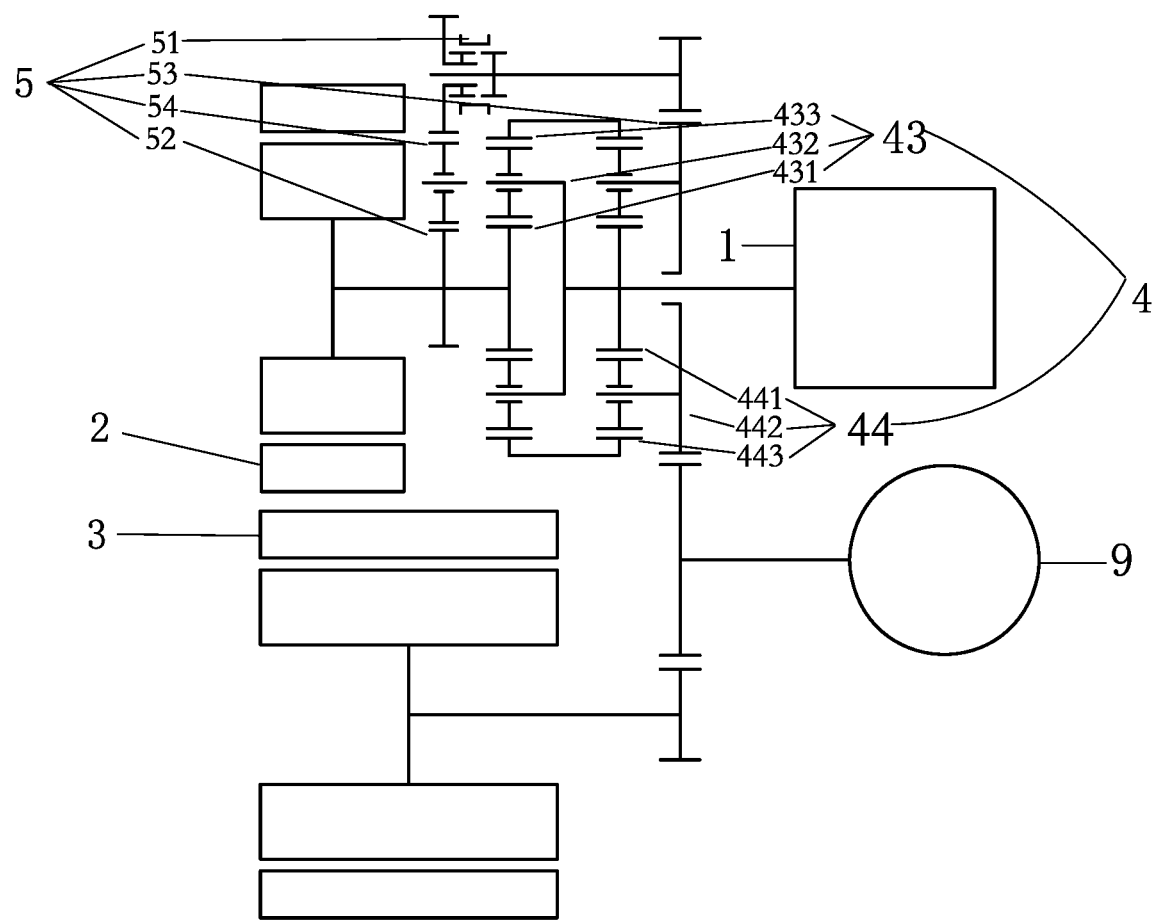
FIG. 2 is a structural schematic diagram of the hybrid electric driving device according to a second embodiment of the present disclosure.

FIG. 2 is a structural schematic diagram of the hybrid electric driving device according to a second embodiment of the present disclosure. As shown in FIG. 2, the power splitting mechanism 4 comprises a first planetary gear set 43 and a second planetary gear set 44. The first planetary gear set 43 comprises a first sun gear 431, a first planet carrier 432, and a first gear ring 433. The second planetary gear set 44 comprises a second sun gear 441, a second planet carrier 442, and a second gear ring 443. The engine 1 is fixedly connected with the first planet carrier 432. The first motor 2 is fixedly connected with the first sun gear 431. The first planet carrier 432 is fixedly connected with the second sun gear 441. The first gear ring 433 is fixedly connected with the second gear ring 443. The second planet carrier 442 is connected with the wheel 9. $K=k_1+k_1/k_2$. $k_1$ is a structural feature parameter of the first planetary gear set 43. $k_2$ is a structural feature parameter of the second planetary gear set 44.

According to a kinematic equations of the first planetary gear set 43 and the second planetary gear set 44, following kinematic and dynamic formulas (1) and (2) are obtained after analysis:

$$n_{m1} + \frac{k_1(1+k_2)}{k_2} n_{out} = \left(1 + k_1 + \frac{k_1}{k_2}\right) n_e \quad (1)$$

$$T_{m1}:T_{out}:T_e = k_2:k_1(1+k_2):(k_1+k_2+k_1k_2) \quad (2)$$

$n_{m1}$ is a rotating speed of the first motor 2 (that is, a rotating speed of the first output end 41). $n_{out}$ is a rotating speed of the second output end 42. $n_e$ is the rotating speed of the engine 1. $T_{m1}$ is the torque of the first motor 2. $T_{out}$ is the torque of the second output end 42. $T_e$ is a torque of the engine 1. $k_1$ is the structural feature parameter of the first planetary gear set 43. $k_2$ is the structural feature parameter of the second planetary gear set 44. The first output end 41 of the power splitting mechanism 4 is the first sun gear 431 shown in FIG. 2, and the second output end 42 of the power splitting mechanism 4 is the second planetary carrier 42 shown in FIG. 2.

Therefore, when the power output by the engine 1 is split by the power splitting mechanism 4, the ratio of the torque of the second output end 42 of the power splitting mechanism 4 to the torque of the first output end 41 of the power splitting mechanism 4 is $K=k_1+k_1/k_2$. Thus, the speed ratio of the bypass mechanism 5 from the first output end 41 to the second output end 42 of the power splitting mechanism 4 is $-(k_1+k_1/k_2)$.

As shown in FIG. 2, the bypass mechanism 5 comprises a first gear 52 mounted on the first output end 41 of the power splitting mechanism 4, a second gear 53 mounted on the second output end 42 of the power splitting mechanism 4, and intermediate gears 54. The intermediate gears 54 are engaged with the first gear 52 and the second gear for transmission 53. The number of the intermediate gears 54 is an odd number.

A speed ratio realized by the first gear 52, the intermediate gears 54, and the second gear 53 should be $-(k_1+k_1/k_2)$. Outer gear meshing transmission is usually used, so a total number of meshing times is an even number (i.e., the number of the intermediate gears 54 is the odd number), thus ensuring that the first output end 41 and the second output end 42 of the power splitting mechanism rotate in opposite directions when in work.

Figure 3:
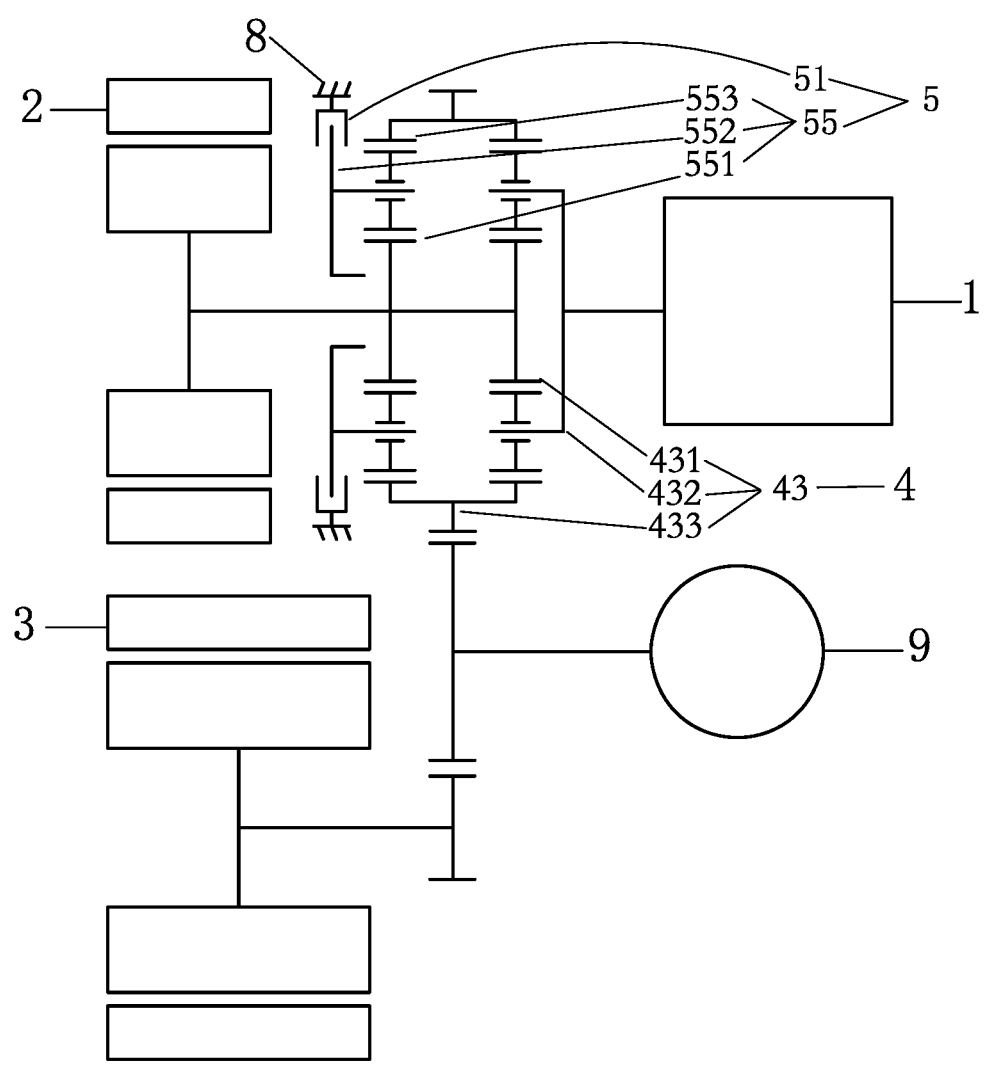
FIG. 3 is a structural schematic diagram of the hybrid electric driving device according to a third embodiment of the present disclosure.

FIG. 3 is a structural schematic diagram of the hybrid electric driving device according to a third embodiment of the present disclosure. As shown in FIG. 3, the power splitting mechanism 4 comprises the first planetary gear set 43. The first planetary gear set 43 comprises the first sun gear 431, the first planet carrier 432, and the first gear ring 433. The engine 1 is fixedly connected with the first planet carrier 432. The first motor 2 is fixedly connected with the first sun gear 432. The first gear ring 433 is fixedly connected with the wheel 9. $K=k_1$. $k_1$ is a structural feature parameter of the first planetary gear set.

According to a kinematic equations of the first planetary gear set 43, following kinematic and dynamic formulas (3) and (4) are obtained.

$$n_{m1} + k_1 n_{out} = (1+k_1) n_e \quad (3)$$

$$T_{m1}: T_{out}:T_e=1: k_1:(1+k_1) \quad (4)$$

$n_{m1}$ is the rotating speed of the first motor 2 (that is, the rotating speed of the first output end 41). $n_{out}$ is the rotating speed of the second output end 42. $n_e$ is the rotating speed of the engine 1. $T_{m1}$ is the torque of the first motor 2. $T_{out}$ is the torque of the second output end 42. $T_e$ is a torque of the engine 1. $k_1$ is the structural feature parameter of the first planetary gear set 43. The first output end 41 of the power splitting mechanism 4 is the first sun gear 431 shown in FIG. 3, and the second output end 42 of the power splitting mechanism 4 is the first gear ring 433 shown in FIG. 3.

Therefore, when the power output by the engine 1 is split by the power splitting mechanism 4, the ratio of the torque of the second output end 42 of the power splitting mechanism 4 to the torque of the first output end 41 of the power splitting mechanism 4 is $K=k_1$. Thus, the speed ratio of the bypass mechanism 5 from the first output end 41 to the second output end 42 of the power splitting mechanism 4 is $-k_1$.

The bypass mechanism 5 comprises a third planetary gear set 55. The third planetary gear set 55 comprising a third sun gear 551, a third planet carrier 552, and a third gear ring 553. The third gear ring 553 is fixedly connected with the first gear ring 433. The third sun gear 551 is fixedly connected with the first sun gear 431. The third planet carrier 552 is connected with a box body 8 through the engagement separation component 51. $k_3$ is a structural feature parameter of the third planetary gear set. $k_3=k_1$.

The bypass mechanism 5 is implemented by using the third planetary gear set, making a structure of the bypass mechanism 5 more compact and easier to arrange than a structure of a fixed shaft gear. When the third planet carrier 552 is locked, a speed ratio of the third planetary gear set 55 is $-k_3$.

In a power splitting mode, after the engagement separation component 51 disengages the first output end of the power splitting mechanism with the second output end of the power splitting mechanism, the third planetary gear set 55 idles, a rotating speed of the third gear ring 553 is equal to the rotating speed of the first gear ring 433, and a rotating speed of the third sun gear 551 is equal to the rotating speed of the first sun gear 431, so that a rotating speed of the third planet carrier 552 is equal to the rotating speed of the engine 1.

The third planetary gear set 55 is same as the first planetary gear set 43. Since the structural feature parameter of the third planetary gear set 55 is same as the structural feature parameter of the first planetary gear set 43.

Therefore, for convenience and cost of manufacturing, the third planetary gear set 55 and the first planetary gear set 43 are same planetary gear set.

Since the third gear ring 553 is fixedly connected with the first gear ring 433, it is only need to provide two bearings to support the third planetary gear set 55 and the first planetary gear set 43, which has a simple structure.

The present disclosure provides a plug-in hybrid electric vehicle (PHEV), which has a pure electric driving mode and a hybrid driving mode. A working principle of the PHEV is described below.

When in the pure electric driving mode, the engagement separation component 51 engages the first output end of the power splitting mechanism with the second output end of the power splitting mechanism, the engine 1 is not in work, and the first motor 2 and the second motor 3 jointly drive the vehicle to move forward or backward.

When the pure electric driving mode is switched the hybrid driving mode, the engagement separation component 51 disengages the first output end of the power splitting mechanism with the second output end of the power splitting mechanism, the first motor 2 drives the engine 1 to start, and the second motor 3 drives the wheel to move.

When in the hybrid driving mode, the engagement separation component 51 disengages the first output end of the power splitting mechanism with the second output end of the power splitting mechanism, and the power output by the engine 1 is transmitted to the power splitting mechanism 4 to drive the first motor 2 and the wheel. The second motor 3 also drives the wheel.

The hybrid electric driving device of the specific embodiments of the present disclosure may be applied in a front-engine front-drive vehicle, a front-engine rear-drive vehicle, or a rear-engine rear-drive vehicle, which is not limited thereto.

In the hybrid electric driving device of the present disclosure, the bypass mechanism 5 ensures that the two motors jointly drive the vehicle forward or reverse in the pure electric driving mode, thereby improving a performance of the hybrid electric driving device.

The present disclosure is not limited to the above embodiments and covers all changes and modifications made without departing from the spirit and scope of the present disclosure. These changes and modifications should not be considered to be out of the spirit and scope of the present disclosure, and all modifications obvious to those skilled in the art shall be comprised in the scope of the attached claims.

What is claimed is:

1. A hybrid electric driving device, comprising:
    an engine,
    a first motor,
    a second motor,
    a power splitting mechanism, and
    a bypass mechanism;
    wherein the power splitting mechanism comprises at least one planetary gear set, an input end, a first output end, and a second output end; the input end of the power splitting mechanism is connected with the engine; the first output end of the power splitting mechanism is connected with the first motor; the second output end of the power splitting mechanism is connected with a wheel of a vehicle; the second motor is connected with the wheel;
    wherein the bypass mechanism is configured to engage the first output end of the power splitting mechanism with the second output end of the power splitting mechanism; the bypass mechanism comprises an engagement separation component; when the engine works, the bypass mechanism is disengaged from the power splitting mechanism, and power output by the engine is transmitted to the power splitting mechanism to drive the first output end and the second output end of the power splitting mechanism respectively; when the engine is not in work, the bypass mechanism is engaged with the power splitting mechanism, and power of the first motor is directly transmitted from the first output end of the power splitting mechanism to the second output end of the power splitting mechanism without transmitting through an interior of the power splitting mechanism;
    wherein a speed ratio of the bypass mechanism from the first output end to the second output end of the power splitting mechanism is $-K$; where K is a ratio of a torque of the second output end of the power splitting mechanism to a torque of the first output end of the power splitting mechanism when the power output by the engine is split by the power splitting mechanism.

2. The hybrid electric driving device according to claim 1, wherein the power splitting mechanism comprises a first planetary gear set and a second planetary gear set; the first planetary gear set comprises a first sun gear, a first planet carrier, and a first gear ring; the second planetary gear set comprises a second sun gear, a second planet carrier, and a second gear ring; the engine is fixedly connected with the first planet carrier; the first motor is fixedly connected with the first sun gear; the first planet carrier is fixedly connected with the second sun gear; the first gear ring is fixedly connected with the second gear ring; the second planet carrier is connected with the wheel; and $K=k_1+k_1/k_2$; $k_1$ is a structural feature parameter of the first planetary gear set; $k_2$ is a structural feature parameter of the second planetary gear set.

3. The hybrid electric driving device according to claim 2, wherein the bypass mechanism comprises a first gear mounted on the first output end of the power splitting mechanism, a second gear mounted on the second output end of the power splitting mechanism, and intermediate gears; the intermediate gears are engaged with the first gear and the second gear for transmission; wherein the number of the intermediate gears is an odd number.

4. The hybrid electric driving device according to claim 1 wherein the power splitting mechanism comprises a first planetary gear set; the first planetary gear set comprises a first sun gear, a first planet carrier, and a first gear ring; the engine is fixedly connected with the first planet carrier; the first motor is fixedly connected with the first sun gear; the first gear ring is fixedly connected with the wheel; $K=k_1$; $k_1$ is a structural feature parameter of the first planetary gear set.

5. The hybrid electric driving device according to claim 4, wherein the bypass mechanism comprises a third planetary gear set; the third planetary gear set comprising a third sun gear, a third planet carrier, and a third gear ring; the third gear ring is fixedly connected with the first gear ring; the third sun gear is fixedly connected with the first sun gear; the third planet carrier is connected with a box body through the engagement separation component; $k_3$ is a structural feature parameter of the third planetary gear set; $k_3=k_1$.

6. The hybrid electric driving device according to claim 5, wherein the third planetary gear set is same as the first planetary gear set.

7. The hybrid electric driving device according to claim 1, wherein in a pure electric driving mode, the engagement separation component engages the first output end of the power splitting mechanism with the second output end of the power splitting mechanism, the engine is not in work, and the first motor and the second motor jointly drive the vehicle to move forward or backward.

8. The hybrid electric driving device according to claim 7, wherein when the pure electric driving mode is switched to a hybrid driving mode, the engagement separation component disengages the first output end of the power splitting mechanism with the second output end of the power splitting mechanism, the first motor drives the engine to start, and the second motor drives the wheel to move.

9. The hybrid electric driving device according to claim 7, wherein when in the hybrid driving mode, the engagement separation component disengages the first output end of the power splitting mechanism with the second output end of the power splitting mechanism, and the power output by the engine is transmitted to the power splitting mechanism to drive the first motor and the wheel; the second motor also drives the wheel.

10. A hybrid electric driving device, comprising:
an engine,
a first motor,
a second motor,
a power splitting mechanism, and
a bypass mechanism;

wherein the power splitting mechanism comprises at least one planetary gear set, an input end, a first output end, and a second output end; the input end of the power splitting mechanism is connected with the engine; the first output end of the power splitting mechanism is connected with the first motor; the second output end of the power splitting mechanism is connected with a wheel of a vehicle; the second motor is connected with the wheel;

wherein the bypass mechanism is configured to engage the first output end of the power splitting mechanism with the second output end of the power splitting mechanism; the bypass mechanism comprises an engagement separation component; when the engine works, the bypass mechanism is disengaged from the power splitting mechanism, and power output by the engine is transmitted to the power splitting mechanism to drive the first output end and the second output end of the power splitting mechanism respectively; when the engine is not in work, the bypass mechanism is engaged with the power splitting mechanism, and power of the first motor is directly transmitted from the first output end of the power splitting mechanism to the second output end of the power splitting mechanism without transmitting through an interior of the power splitting mechanism;

wherein in a pure electric driving mode, the engagement separation component engages the first output end of the power splitting mechanism with the second output end of the power splitting mechanism, the engine is not in work, and the first motor and the second motor jointly drive the vehicle to move forward or backward.

* * * * *